United States Patent
Alandt et al.

(10) Patent No.: US 9,367,335 B2
(45) Date of Patent: Jun. 14, 2016

(54) STATE DEPENDENT OPTIMIZATION FOR SEQUENTIAL BOOTING OF HETEROGENEOUS SYSTEMS

(71) Applicant: International Business Machines Corporation, Armonk, NY (US)

(72) Inventors: Thomas J. Alandt, Knightdale, NC (US); Shareef F. Alshinnawi, Durham, NC (US); Gary D. Cudak, Creedmoor, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 311 days.

(21) Appl. No.: 13/940,327

(22) Filed: Jul. 12, 2013

(65) Prior Publication Data

US 2015/0019851 A1 Jan. 15, 2015

(51) Int. Cl.
*G06F 9/44* (2006.01)
*G06F 9/445* (2006.01)

(52) U.S. Cl.
CPC .............. *G06F 9/4416* (2013.01); *G06F 9/445* (2013.01)

(58) Field of Classification Search
CPC .................................................... G06F 9/4416
See application file for complete search history.

(56) References Cited

U.S. PATENT DOCUMENTS

| | | | |
|---|---|---|---|
| 5,379,431 A | 1/1995 | Lemon et al. | |
| 5,513,358 A | 4/1996 | Lundberg et al. | |
| 5,794,031 A | 8/1998 | Nakadai | |
| 6,088,727 A | 7/2000 | Hosokawa et al. | |
| 6,401,140 B1 | 6/2002 | Wu | |
| 6,530,031 B1 * | 3/2003 | Randall et al. | 713/502 |
| 6,671,802 B1 | 12/2003 | Ott | |
| 6,697,954 B1 | 2/2004 | Stufflebeam | |
| 6,748,525 B1 | 6/2004 | Hubacher et al. | |
| 6,792,526 B1 * | 9/2004 | Klein et al. | 713/1 |
| 7,065,673 B2 * | 6/2006 | Subramaniam et al. | 714/13 |
| 7,134,027 B2 | 11/2006 | Calhoon | |
| 7,299,347 B1 | 11/2007 | Kao | |

(Continued)

OTHER PUBLICATIONS

Citrix "How to Create a Staggered Scheduled Server Reboot Policy in XenApp 6.", http://support.citrix.com/article/CTX126043, Document ID: CTX126043 / Created on: Sep. 23, 2010, 3 pages.

(Continued)

*Primary Examiner* — Jaweed A Abbaszadeh
*Assistant Examiner* — Gary Collins
(74) *Attorney, Agent, or Firm* — Katherine S. Brown; Jeffrey L. Streets

(57) ABSTRACT

A method and computer program product for implementing the method, where the method comprises obtaining boot dependencies among a plurality of systems, wherein a boot dependency identifies a dependent system, a service system that provides a service to the dependent system, a provide state of the service system, and a need state of the dependent system that requires the service system to have reached the provide state. The method further comprises obtaining historical measurements of the time periods between states for each of the systems. Then, during a process of booting the plurality of systems, the method initiates boot of each dependent system at a time that is determined, based on the historical measurements, to allow the dependent system to reach the need state no earlier than the time at which the service system is determined, based on the historical measurements, to reach the provide state.

16 Claims, 6 Drawing Sheets

(56) References Cited

U.S. PATENT DOCUMENTS

| | | | |
|---|---|---|---|
| 7,356,684 B2 | 4/2008 | Han et al. | |
| 7,389,410 B1* | 6/2008 | Hardman | 713/1 |
| 7,415,519 B2 | 8/2008 | Abbondanzio et al. | |
| 7,444,532 B2 | 10/2008 | Masuyama et al. | |
| 7,480,822 B1* | 1/2009 | Arbon et al. | 714/13 |
| 7,546,448 B2 | 6/2009 | Dickens et al. | |
| 7,574,592 B2 | 8/2009 | Dickens et al. | |
| 7,774,589 B2 | 8/2010 | Corrao et al. | |
| 7,818,621 B2 | 10/2010 | Childress et al. | |
| 7,870,557 B2 | 1/2011 | Fontaine et al. | |
| 8,312,115 B2 | 11/2012 | Lipscombe et al. | |
| 9,021,294 B2* | 4/2015 | Reddy | 714/4.11 |
| 2004/0186688 A1 | 9/2004 | Nejedlo | |
| 2005/0268184 A1 | 12/2005 | Hou et al. | |
| 2006/0075407 A1* | 4/2006 | Powers et al. | 718/100 |
| 2006/0294507 A1* | 12/2006 | Buskens et al. | 717/133 |
| 2007/0150589 A1 | 6/2007 | Kim et al. | |
| 2010/0070745 A1 | 3/2010 | Chiu | |
| 2010/0174810 A1* | 7/2010 | Cain et al. | 709/222 |
| 2011/0302638 A1 | 12/2011 | Cha et al. | |
| 2012/0072740 A1 | 3/2012 | Chen et al. | |
| 2012/0117368 A1 | 5/2012 | Itoh | |

OTHER PUBLICATIONS

WMSoftware, "Safe Auto Logon password Server—Centrally manages user names and Safe AutoLogon computers. Enforces HIPAA compliance and internal password policies" Mar. 7, 2013, 2 pages.

* cited by examiner

Monitored Computer Systems Data 160

| System ID | Current State | Vital Product Data |
|---|---|---|
|  |  |  |
|  |  |  |
|  |  |  |
|  |  |  |
|  |  |  |

FIG. 4

Systems Dependency Data 170

| Dependent System | Need State | Service System | Provide State |
|---|---|---|---|
| Compute2 | OS Kernel Load | FileSys1 | TFTP 100% |
|  |  |  |  |
|  |  |  |  |
|  |  |  |  |

FIG. 5

State Arrival Time Data 180

| System | State A | State B | Time | Cummulative Arrival Time |
|---|---|---|---|---|
| Filesys1 | POST | UEFI Init. | 0:21 | 0:21 |
| Filesys1 | UEFI Init. | OSBootLoad | 1:18 | 1:39 |
| Filesys1 | OSBootLoad | TFTP 100% | 0:32 | 2:11 |
| Compute2 | POST | UEFI Init. | 0:17 | 0:17 |
| Compute2 | UEFI Init. | OSKernel Init. | 0:17 | 0:34 |

FIG. 6

STATE DEPENDENT OPTIMIZATION FOR SEQUENTIAL BOOTING OF HETEROGENEOUS SYSTEMS

BACKGROUND

1. Field of the Invention

The present invention relates to systems and methods for booting computer systems.

2. Background of the Related Art

After turning on power to a computer (or "compute node"), the computer must go through a booting process before being ready for normal operations. The booting process may be controlled by a basic input output system (BIOS) that is stored in read only memory (ROM) and contains an initial set of instructions for performing a power-on self-test, identifying and initializing peripheral devices, and loading an operating system from mass memory.

In computer systems having multiple compute nodes, storage devices and other components of various types (a "heterogeneous system"), any particular component of the computer system may require the services of another component of the computer system, or require information available from another component of the computer system. Accordingly, booting a large heterogeneous computer system can take a considerable amount of time before every component of the computer system has reached full functionality. Errors or timeouts occurring during the boot process may require the involvement of a system administrator to guide the process forward, such that the boot process is not truly autonomous.

BRIEF SUMMARY

One embodiment of the present invention provides a method, comprising obtaining boot dependencies among a plurality of systems, wherein a boot dependency identifies a dependent system, a service system that provides a service to the dependent system, a provide state of the service system, and a need state of the dependent system that requires the service system to have reached the provide state. The method further comprises obtaining historical measurements of the time periods between states for each of the systems. Then, during a process of booting the plurality of systems, the method initiates boot of each dependent system at a time that is determined, based on the historical measurements, to allow the dependent system to reach the need state no earlier than the time at which the service system is determined, based on the historical measurements, to reach the provide state.

Another embodiment of the present invention provides a computer program product including computer readable program code embodied on a computer readable storage medium. The computer program product includes: computer readable program code for obtaining boot dependencies among a plurality of systems, wherein a boot dependency identifies a dependent system, a service system that provides a service to the dependent system, a provide state of the service system, and a need state of the dependent system that requires the service system to have reached the provide state; computer readable program code for obtaining historical measurements of the time periods between states for each of the systems; and computer readable program code for, during a process of booting the plurality of systems, initiating boot of each dependent system at a time that is determined, based on the historical measurements, to allow the dependent system to reach the need state no earlier than the time at which the service system is determined, based on the historical measurements, to reach the provide state.

BRIEF DESCRIPTION OF THE SEVERAL VIEWS OF THE DRAWINGS

FIG. 4 is a table representing monitored computer systems data maintained by the central management entity.

FIG. 5 is a table representing systems dependent data maintained by the central management entity.

FIG. 6 is a table representing state arrival time data maintained by the central management entity.

DETAILED DESCRIPTION

Figure 1:
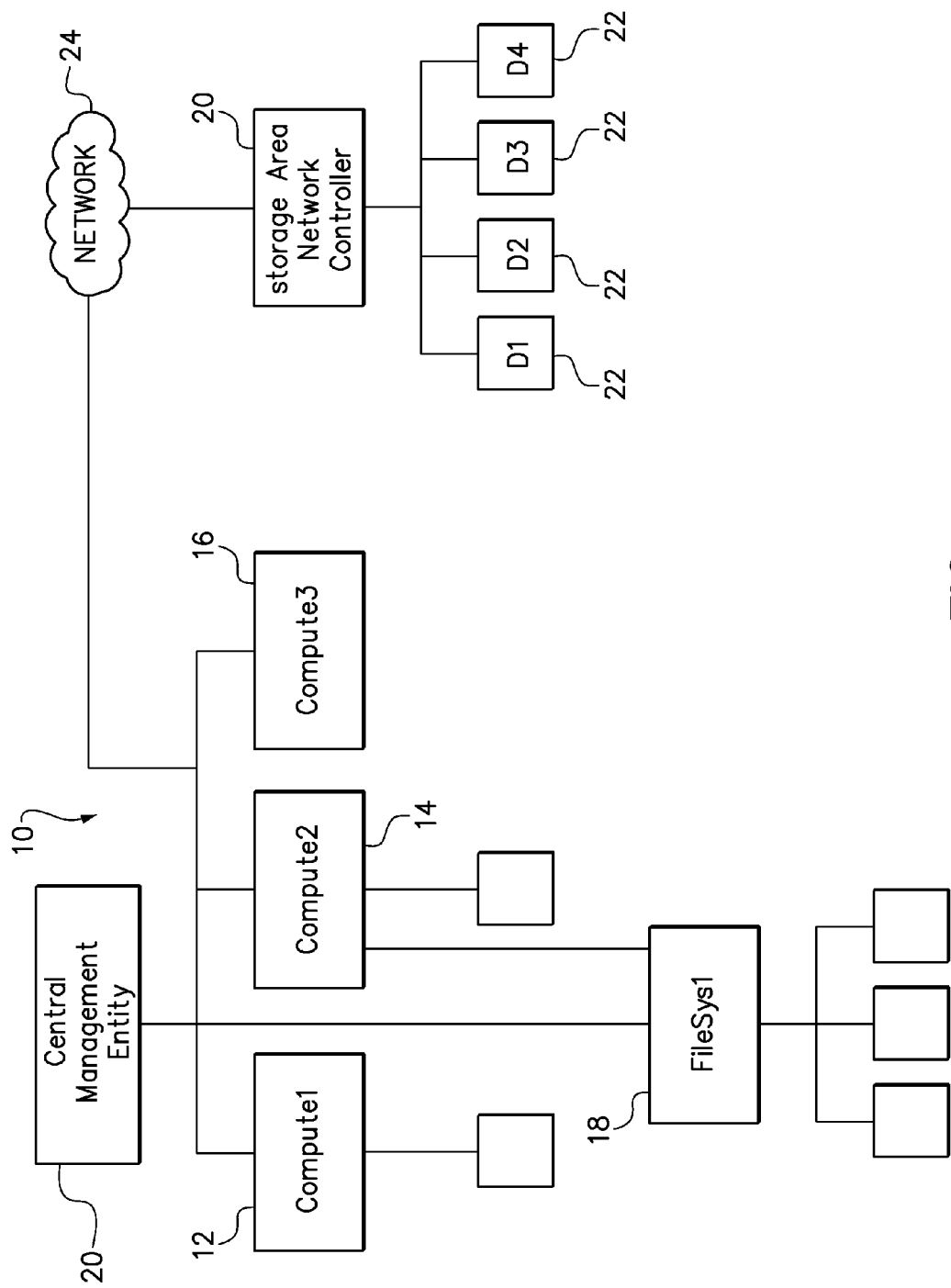
FIG. 1 is a diagram of a heterogeneous computer system in which embodiments of the invention may be implemented.

One embodiment of the present invention provides a method, comprising obtaining boot dependencies among a plurality of systems, wherein a boot dependency identifies a dependent system, a service system that provides a service to the dependent system, a provide state of the service system, and a need state of the dependent system that requires the service system to have reached the provide state. The method further comprises obtaining historical measurements of the time periods between states for each of the systems. Then, during a process of booting the plurality of systems, the method initiates boot of each dependent system at a time that is determined, based on the historical measurements, to allow the dependent system to reach the need state no earlier than the time at which the service system is determined, based on the historical measurements, to reach the provide state.

The boot dependencies among the plurality of systems may be obtained in various ways, such as reading a previously stored file describing those boot dependencies. For example, the boot dependencies may be may be manually entered into a computer readable file and stored on a computer readable storage medium for use in accordance with methods of the present invention. A system administrator with knowledge of the components, system topology and boot sequences would be able to provide data representative of the boot dependencies. It is not necessary that every boot dependency be obtained. Rather, the methods of the present invention will provide benefits in proportion to the completeness of the boot dependencies obtained. In one alternative to a manual entry method, boot dependencies may be determined by analyzing previous boot histories. For example, a discovery process can involve, at one or each fully booted state, track which systems provided each service, such as network file server (NFS) or discovery host control protocol (DHCP), and report this information back to the management entity. Furthermore, if a boot is being held up by lack of an available service, a timestamp can be recorded to compare to when booting was possible after that and use that time frame to compare when the providing service was offline and then online to make the correlation.

It should be recognized that the plurality of systems will typically include at least one system that is truly independent of any other system. For example, a data storage device, such as a hard disk drive, may be turned on and become fully functional without any reliance on other services or information. Other systems may depend upon the hard disk drive, for example where the hard disk drive stores an operating system that a compute node needs to load in order for the compute node to become fully functional. It should also be recognized that any particular system may be dependent with respect to one system, and yet also be depended upon to provide required services to one or more other system. Accordingly, the boot dependencies may include one entry or record that identifies a particular system as being a "dependent system" and having a "need state", while another entry or record may identify the same system as being a "service system" and having a "provide state."

The methods of the present invention make use of historical measurements of the time periods between states for each of the systems. These historical measurements are obtained during an actual boot process for the same plurality of systems. By storing the measured time period between states, this data can be subsequently used in the methods of the present invention. The historical measurements may, however, be updated from time to time in order to more accurately represent the time between states that the systems will experience during a current boot process. The boot time between states may increase or decrease as the system data or configuration changes.

In one embodiment of the invention, the boot of each dependent system is initialized at a state arrival time differential following the initialization of the service computer system. For example, the state arrival time differential is the difference between the cumulative time for the service system to reach the provide state required by the dependent system and the cumulative time for the dependent system to reach the need state. The boot dependency data identifies the dependent system, the service system, the need state and the provide state, while the historical measurements of times between states provide the time between states data needed for determining the state arrival time differential between the service system and the dependent system. After initiating boot of the service system, the boot of the dependent system may be subsequently initiated after waiting for a period of time equal to the state arrival time differential. If the dependent system and service system boot in a manner consistent with the historical time between state data, then the dependent system will reach its need state at exactly the time that the service system reaches its provide state. Minor variations in actual time between states is easily tolerated. The methods described herein are beneficial, because they dramatically reduce the amount of time that the dependent system is powered one, yet unproductive while waiting for information or services from the service system.

Another embodiment of the invention may determine a state arrival time differential in a slightly different manner. Where each system is reporting every change in state to a central management device, it is not necessary to calculate the state arrival time from the point of initiating boot of the service system. Rather, some intermediate state of the service system may be used as the basis for the state arrival time differential calculation. Since the time between states is variable, a calculation of the time at which the service system is expected to reach the provide state is more accurate after the service system has already completed one or more states in the boot process. Accordingly, when the central management device receives notice that the service system has reached a new state in the boot process, it may calculate a new or updated state arrival time differential. For example, the new or updated state arrival time differential is the difference between the cumulative time for the service system to reach the provide state (from its current state) and the cumulative time for the dependent system to reach the need state.

In yet another embodiment, the method may initiate boot of an independent system prior to initiating boot of any dependent system. However, it may also be beneficial to delay booting an independent system if all of its provide states are not needed for a period of time that exceeds the amount of time necessary for the independent system to reach the provide state. Accordingly, it can be envisioned that a dependent system takes longer to reach its need state than a corresponding service system takes to reach its provide state, such that the state arrival time differential indicates the need to initiate boot of the dependent system prior to initiating boot of the independent system.

In a further embodiment, a dependent system may have a first need state that depends upon a first provide state of a first service system and a second need state that depends upon a second provide state of a second service system. In this situation, the method may further comprise determining first and second state arrival time differentials. A first state arrival time differential may be determined as the difference between the cumulative time for the first service system to reach the first provide state required by the first need state of the dependent system and the cumulative time for the dependent system to reach the first need state. A second state arrival time differential may be determined as the difference between the cumulative time for the second service system to reach the second provide state required by the second need state of the dependent system and the cumulative time for the dependent system to reach the second need state. Accordingly, the method may initiate boot of the dependent system based upon the later of the first state arrival time differential and the second state arrival time differential. It should be recognized that the first and second need states may be the same need state.

The methods of the present invention may further include estimating an amount of time for the plurality of systems to be fully operational. Using the historical times between states for each system in the plurality of systems, and using the dependency data to determine state arrival time differentials, it is possible to calculate the total amount of the time that is expected from initiating boot of the very first system to full operability of all of the systems.

The methods of the present invention may further be used to determine a measure of wellness of the systems. For example, the method may make current measurements of the time periods between states for one or more of the systems during the process of booting the plurality of systems, compare the current measurements of time periods between states for the one or more systems to the historical measurements of the time periods between the same states for the one or more systems, and outputting the comparison as a measure of wellness of the one or more systems. A much longer time period in a given state, such as POST, may indicate a problem with a given system. A much longer cumulative time period for the plurality of systems to be fully operational may indicate a more widespread problem.

Similarly, the methods may compare the number of systems initialized during a given time period since beginning a current boot process to the number of systems initialized during the same time period in a previous boot process, and outputting the comparison as an indication of slowness in the boot process.

Still further, the methods may include determining an indicator of progress or readiness for the entire plurality of systems, such as a cluster. Since each system reports its boot progress to the central management entity, the central management entity can compare the number of systems booted and ready with the total number of systems. This fraction or percentage may be used as a measure of cluster progress or readiness. If there is a problem in the boot process, the system administrator can easily determine the system responsible for the progress stoppage.

As mentioned above, the boot of each system may be initiated by a central management entity. Furthermore, each system may report state changes to the central management entity. Such state changes may be selected from power on self test (POST), unified extensible firmware interface (UEFI) initialization, UEFI percent completion of initialization (at multiple stages), operating system (OS) bootloader initialization, and OS kernel percent completion of load (at multiple stages). Each service system may also report a change in the state of a service selected from a network file system (NFS), dynamic host configuration profile (DHCP), file transfer protocol (FTP), trivial file transfer protocol (TFTP), secure shell (SSH—which protocol allows a user to securely send commands to a server, such as lightweight directory access protocol (LDAP) embedded in a secure shell), hyper-text transfer protocol (HTTP), and system management bus (SMB). Reporting state changes may be facilitated by each system storing a communication address to the central management entity in a basic input output system (BIOS) setting, UEFI setting, or an operating system (such as an OS kernel, startup script or runlevel script manager), and wherein the communication address is an internet protocol (IP) address, a media access control (MAC) address, a world wide port name (WWPN), or a Bluetooth identification (ID). Each system may also report additional information to the central management entity, such a role of the system, a name for the system, or vital product data for the system.

It should be recognized that the methods of the present invention are not limited to any particular configuration or topology. For example, the plurality of computer systems may form a cluster, a datacenter, or a cloud.

A still further embodiment of the present methods may include delaying the boot of a dependent system in response to a service system running at a resource utilization that exceeds a resource utilization threshold. For example, if the service system is running at 100% utilization, this condition may be reported to the central management device, which may then delay boot commands for one or more systems that depend on that service system, until the utilization of the service system drops below a lower utilization threshold.

Another embodiment of the present invention provides a computer program product including computer readable program code embodied on a computer readable storage medium. The computer program product includes: computer readable program code for obtaining boot dependencies among a plurality of systems, wherein a boot dependency identifies a dependent system, a service system that provides a service to the dependent system, a provide state of the service system, and a need state of the dependent system that requires the service system to have reached the provide state; computer readable program code for obtaining historical measurements of the time periods between states for each of the systems; and computer readable program code for, during a process of booting the plurality of systems, initiating boot of each dependent system at a time that is determined, based on the historical measurements, to allow the dependent system to reach the need state no earlier than the time at which the service system is determined, based on the historical measurements, to reach the provide state.

The foregoing computer program products may further include computer readable program code for implementing or initiating any one or more aspects of the methods described herein. Accordingly, a separate description of the methods will not be duplicated in the context of a computer program product.

Embodiments of the present invention provide methods and computer program products for autonomously booting a heterogeneous computer system utilizing the state of a system as a determinant and a relationship to dependent systems, to bring the heterogeneous computer system online. The method may conserve power since dependent systems are not turned on until the services required by those components, such as DHCP/TFTP and network storage systems, will be available. By delaying power on of various components, it is possible for the network boot systems to avoid recycling or rebooting a component. Recycling or rebooting can become necessary after a component stops attempting to get an address or other service after a certain amount of time. Avoiding the need to recycle or reboot a component will conserve power and shorten the amount of time needed for a large computer system to reach full functionality.

FIG. 1 is a diagram of a heterogeneous computer system 10 in which embodiments of the invention may be implemented. The system 10 includes a central management entity 20, compute nodes 12, 14, 16, a file system 18, a storage area network 20 and hard disk drives 22. The system 10 may include any number of additional and/or different system components. In this example, the storage area network 20 is accessible over a network 24.

Figure 2A:
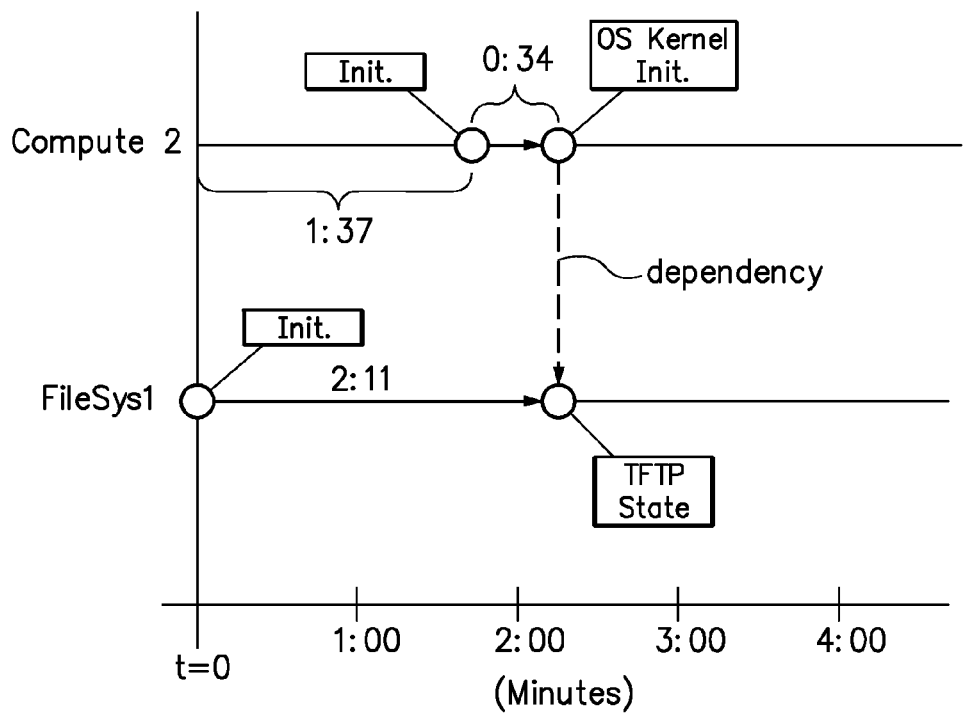
FIGS. 2A, 2B and 2C are timelines of a boot process for components of the heterogeneous computer system.

FIG. 2 is a timeline of a hypothetical calculation of a state arrival time differential for a dependent system that depends on a single service system. The dependent system is "Compute2" and the service system is "FileSys1." The "OS Kernel Initialization" (need state) of Compute2 (dependent system) needs FileSys1 (service system) to reach the TFTP state (provide state). The historical time between states data for FileSys1 is used to determine that FileSys 1 can be expected to require 2:11 (2 minutes and 11 seconds) to go from initialization to the TFTP state (provide state). For Compute2, the historical time between states data for Compute2 is used to determine that Compute2 can be expected to require 0:34 (34 seconds) to reach the OS kernel initiation state (need state). Therefore, the state arrival time differential for Compute2, relative to FileSys1 is 1:37 (1 minute 37 seconds), based upon the difference between 2:11 and 0:34. Noting the timeline, Compute2 may be initiated at time 1:37 after initialization of FileSys1 in order for Compute2 to reach the need state at approximately the same time that FileSys1 reaches the provide state. Accordingly, a central management entity may send an IPMI or other management power up command (via xCAT, etc.) to Compute2 at time 1:37. The electrical power associated with running Compute2 for 1:37 is saved.

Figure 2B:
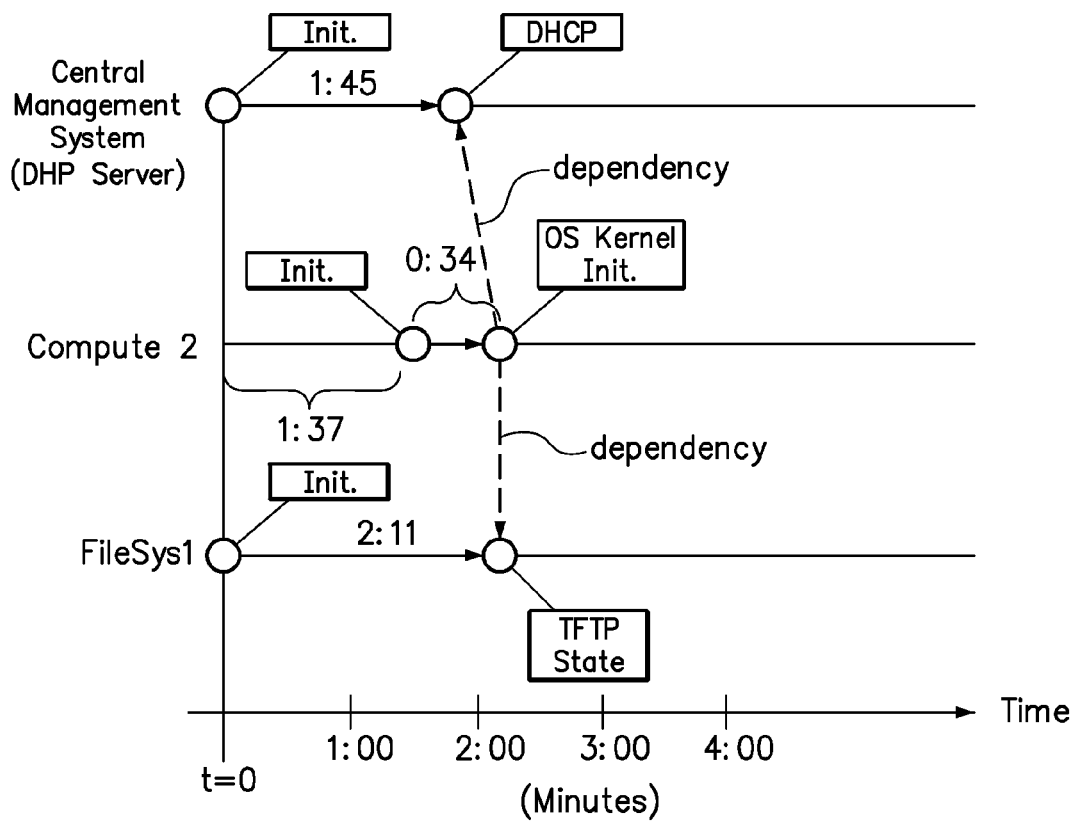

FIG. 2B is a timeline of a hypothetical calculation of a state arrival time differential for a dependent system that depends on two service systems. In this example, a central management entity or system (CMS) runs a dynamic host configuration protocol (DHCP) server, which hands out IP addresses. A file server (FileSys1) needs an IP address in order to get on a network properly. A compute node (Compute2) needs both CMS and FileSys1 to reach states where the DHCP service is running on CMS and a network file system (NFS) is running on FileSys1. So, CMS is booted by a management entity at time where the time differential to the last of all needed services will be online. So if IPs will be available via DHCP early but the NFS may not be, then management entity may hold booting Compute2 until the differential for NFS is met instead of DHCP. Or it could be a combination. So, given the hypothetical time between states as shown, Compute 2 would still be initialized at 1:37.

If a system has no dependancies, it can boot any time. It may be possible that a system needs more than one additional system and at two different states (i.e. may need DHCP from one and NFS from another) and may boot at a time differential of whichever is calculated to be reached last. Where a system depends upon two other systems, the dependent system preferably will not boot until the later of the two state arrival time differentials.

Figure 2C:
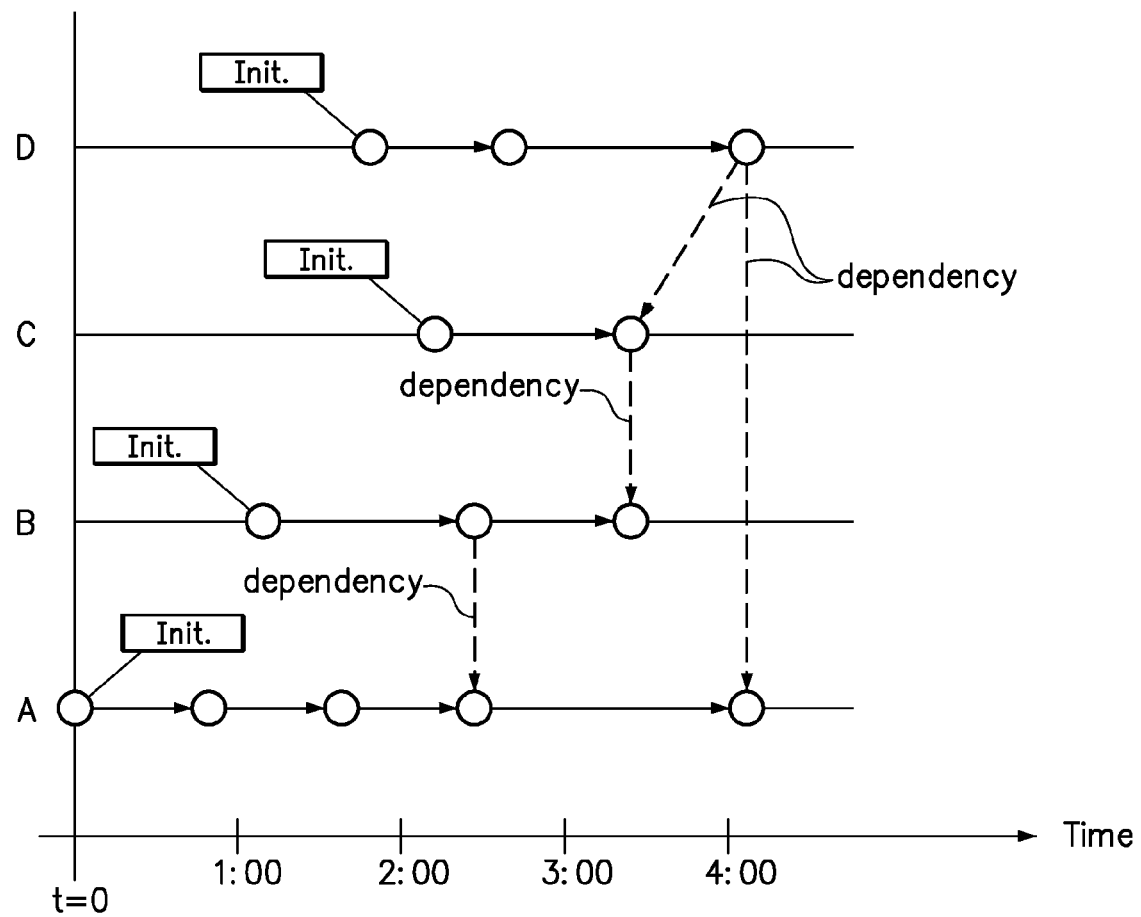

FIG. 2C is a timeline of a hypothetical boot process based on several state arrival time differentials for systems in a cluster. Several points can be made about the boot process show. First, some of the systems A-D are shown having multiple states. For a compute node, one example of a full boot process may include: (1) POST; (2) UEFI load; (3) OS initialization; (4) File system mount; and (5) Service initialization (individual services, such as DHCP, NFS, etc). As shown, System A is independent, because it does not rely upon any other system. System B is both a dependent system as to System A and a service system as to System C. System D depends upon both System C and System A, so it is initialized when the later of the two systems have reached the provide state associated with System D's need state. The Systems A-D may be initialized at different times as shown. Various system configurations with different dependencies and times between states would lead to other timelines, based upon the same principles described herein.

Figure 3:
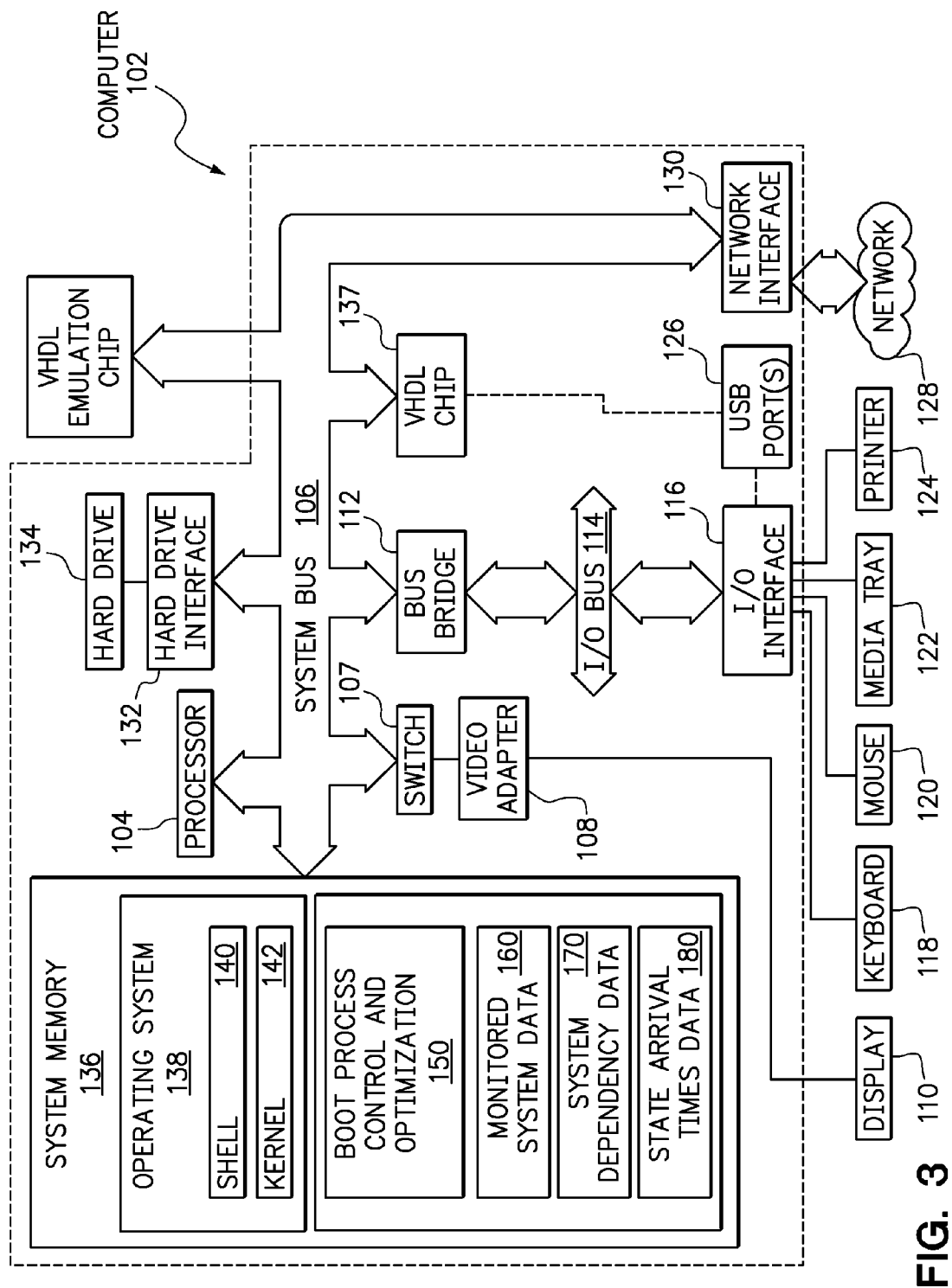
FIG. 3 is a diagram of a central management entity for controlling the boot process of the heterogeneous computer system.

FIG. 3 is a diagram of an exemplary computing node (or simply "computer") 102 that may be utilized in accordance with one or more embodiments of the present invention. Note that some or all of the exemplary architecture, including both depicted hardware and software, shown for and within computer 102 may be implemented in the central management entity 20 (See FIG. 1) for controlling the boot process of the heterogeneous computer system (See system 10 of FIG. 1), but may also be representative of the hardware of compute nodes 12, 14, 16 as shown in FIG. 1.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, the computer 102 is able to communicate over a network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and other application programs and data storage. As shown, the computer 102 serves as the central management entity 20 and includes a boot process control and optimization module 150, monitored systems data 160, system dependency data 170, and state arrival times data 180 for implementing the methods described herein.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative components suitable to perform the processes of the present invention. For instance, computer 102 may include alternate memory storage devices such as magnetic cassettes, digital versatile disks (DVDs), Bernoulli cartridges, and the like. These and other variations are intended to be within the spirit and scope of the present invention.

FIG. 4 is a table representing monitored computer systems data 160 maintained by the central management entity. Each of the systems that are being monitored and control during the boot process may be represented by a system ID. As each system reports their current state, that information is stored in the record associated with the system ID. Some embodiments may even collect and store vital product data (VPD) for the system.

FIG. 5 is a table representing systems dependent data 170 maintained by the central management entity. This data represents the relationships and dependancies of systems in a cluster, datacenter or cloud. Each record includes a dependent system, a need state associated with the dependent system, a service system, and a provide state associated with the service system. In the populated record, Compute2 (dependent system) has an OS kernel load state (need state) that needs FileSys1 (service system) to have reached the trivial file transfer protocol (TFTP) 100% complete state (provide state). This type of record may be graphically represented as in FIGS. 2A-2C.

FIG. 6 is a table representing state arrival time data 180 maintained by the central management entity. Each record includes a system ID, a first state, a second state, the time to get from the first state to the second state, and the cumulative arrival time since power on to reach the second state. For example, the first record shows that FileSys1 takes 0:21 (21 seconds) to get from POST to UEFI Initialization. Similarly, the cumulative arrival time (fourth column) in the third record shows that FileSys1 takes 2:11 (2 minutes, 11 seconds) to reach TFTP 100%. This data is used to determine state arrival time differentials by calculating the difference between the arrival time to a provide state and the arrival time to an associated need state. A provide state and need state are associated by being in a common record of the systems dependency data in FIG. 5.

Figure 7:
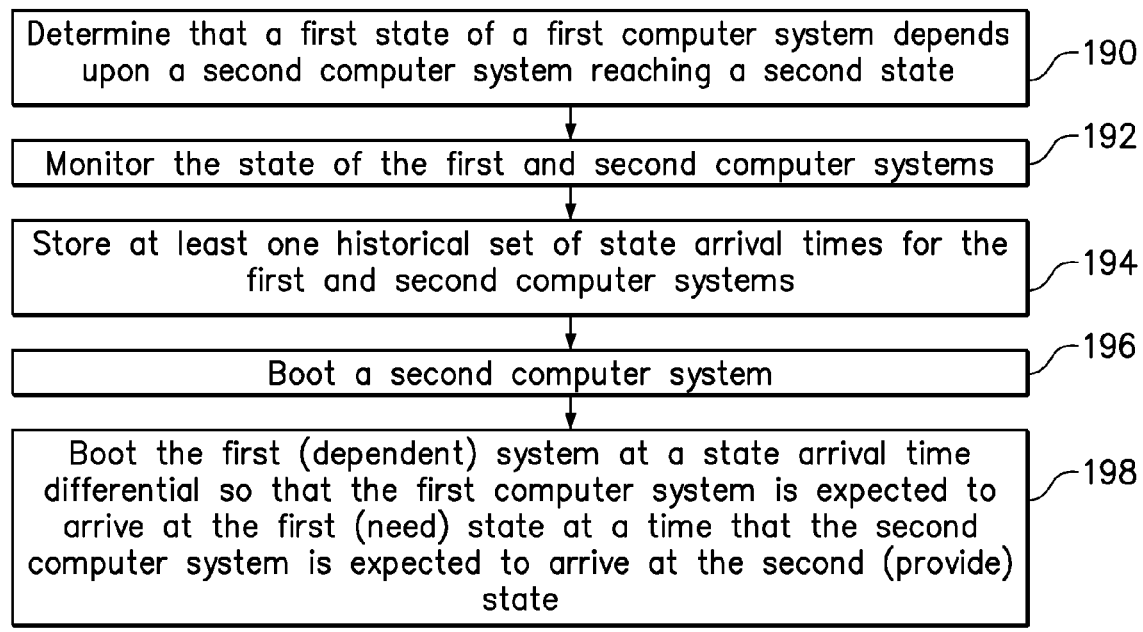
FIG. 7 is a flowchart of a method in accordance with one embodiment of the present invention.

FIG. 7 is a flowchart of a method in accordance with one embodiment of the present invention. In step 190, the method determines that a first state of a first computer system depends upon a second computer system reaching a second state. In step 192, the method monitors the state of the first and second computer systems, and then stores at least one historical set of state arrival times for the first and second computer systems in step 194. A second computer system is booted in step 196. Then, in step 198, the first (dependent) system is booted at a state arrival time differential so that the first computer system is expected to arrive at the first (need) state at a time that the second computer system is expected to arrive at the second (provide) state.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable storage medium having computer-usable program code stored thereon.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as JAVA (a trademark of Oracle America, Inc.), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   obtaining boot dependencies among a plurality of systems, wherein a boot dependency identifies a dependent system, a service system that provides a service to the dependent system, a provide state of the service system, and a need state of the dependent system that requires the service system to have reached the provide state;
   obtaining historical measurements of the time periods between states for each of the systems; and
   during a process of booting the plurality of systems, initiating boot of each dependent system at a time that is determined, based on the historical measurements, to allow the dependent system to reach the need state no earlier than the time at which the service system is determined, based on the historical measurements, to reach the provide state;
   wherein the boot of each dependent system is initialized at a state arrival time differential following the initialization of the service computer system, and wherein the state arrival time differential is the difference between the cumulative time for the service system to reach the provide state required by the dependent system and the cumulative time for the dependent system to reach the need state.

2. The method of claim 1, further comprising:
   initiating boot of an independent system prior to initiating boot of any dependent system.

3. The method of claim 1, further comprising:
   estimating an amount of time for the plurality of systems to be fully operational.

4. The method of claim 1, further comprising:
   making current measurements of the time periods between states for one or more of the systems during the process of booting the plurality of systems;
   comparing the current measurements of time periods between states for the one or more systems to the historical measurements of the time periods between states for the one or more systems; and
   outputting the comparison as a measure of wellness of the one or more systems.

5. The method of claim 1, wherein the boot of each system is initiated by a central management entity.

6. The method of claim 5, further comprising:
   each computer system reporting state changes to the central management entity.

7. The method of claim 6, wherein the state change includes a change in the state of a service selected from a network file system (NFS), dynamic host configuration profile (DHCP), file transfer protocol (FTP), trivial file transfer protocol (TFTP), SSH, hyper-text transfer protocol (HTTP), and system management bus (SMB).

8. The method of claim 6, wherein the state change includes a new state selected from power on self test (POST), UEFI initialization, UEFI percent completion of initialization, OS bootloader initialization, and OS kernel percent completion of load.

9. The method of claim 6, wherein each system stores a communication address to the central management entity in a BIOS setting, UEFI setting, or an operating system, and wherein the communication address is an IP address, a MAC address, a WWPN, or a Bluetooth ID.

10. The method of claim 6, further comprising:
    each system reporting additional information to the central management entity, wherein the additional information is selected from a role of the system, a name for the system, or vital product data for the system.

11. The method of claim 1, wherein the plurality of computer systems form a cluster, a datacenter, or a cloud.

12. The method of claim 1, further comprising:
    comparing the number of systems initialized during a given time period since beginning a current boot process to the number of systems initialized during the same time period in a previous boot process; and
    outputting the comparison as an indication of slowness in the boot process.

13. The method of claim 1, further comprising:
    storing current measurements of the time periods between states for each of the systems.

14. The method of claim 1, further comprising:
delaying the boot of a dependent system in response to a service system running at a resource utilization that exceeds a resource utilization threshold.

15. A method, comprising:
obtaining boot dependencies among a plurality of systems, wherein a boot dependency identifies a dependent system, a service system that provides a service to the dependent system, a provide state of the service system, and a need state of the dependent system that requires the service system to have reached the provide state;
obtaining historical measurements of the time periods between states for each of the systems; and
during a process of booting the plurality of systems, initiating boot of each dependent system at a time that is determined, based on the historical measurements, to allow the dependent system to reach the need state no earlier than the time at which the service system is determined, based on the historical measurements, to reach the provide state, wherein a dependent system has a first need state that depends upon a first provide state of a first service system and a second need state that depends upon a second provide state of a second service system;
determining a first state arrival time differential as the difference between the cumulative time for the first service system to reach the first provide state required by the first need state of the dependent system and the cumulative time for the dependent system to reach the first need state;
determining a second state arrival time differential as the difference between the cumulative time for the first service system to reach the first provide state required by the first need state of the dependent system and the cumulative time for the dependent system to reach the first need state; and
initiating boot of the dependent system based upon the later of the first state arrival time differential and the second state arrival time differential.

16. A computer program product including computer readable program code embodied on a non-transitory computer readable storage medium, the computer program product including:
computer readable program code for obtaining boot dependencies among a plurality of systems, wherein a boot dependency identifies a dependent system, a service system that provides a service to the dependent system, a provide state of the service system, and a need state of the dependent system that requires the service system to have reached the provide state;
computer readable program code for obtaining historical measurements of the time periods between states for each of the systems; and
computer readable program code for, during a process of booting the plurality of systems, initiating boot of each dependent system at a time that is determined, based on the historical measurements, to allow the dependent system to reach the need state no earlier than the time at which the service system is determined, based on the historical measurements, to reach the provide state, wherein the boot of each dependent system is initialized at a state arrival time differential following the initialization of the service computer system, and wherein the state arrival time differential is the difference between the cumulative time for the service system to reach the provide state required by the dependent system and the cumulative time for the dependent system to reach the need state.

* * * * *